March 31, 1959 J. H. JACOBS 2,880,281

SOUND FILM RECORDING SYSTEM

Filed July 9, 1956

INVENTOR
J. H. JACOBS
BY
J. F. McEneany
ATTORNEY

United States Patent Office 2,880,281

Patented Mar. 31, 1959

2,880,281

SOUND FILM RECORDING SYSTEM

John H. Jacobs, Pacoima, Calif., assignor to Westrex Corporation, New York, N.Y., a corporation of Delaware Application July 9, 1956, Serial No. 596,662

5 Claims. (Cl. 179—100.3)

This invention relates to photographic sound recording and particularly to novel improvements permitting the recording of a direct positive photographic sound record.

It is the object of this invention to accomplish the recording of a direct positive variable area photographic sound record by means of a light valve recording system.

In the recording of sound to accompany action simultaneously recorded on a picture film, it has been found advantageous to record a sound record in which, on the positive print, the recorded noise reduction modulation appears at the center of the sound track as an opaque area increasing and decreasing in width laterally of the track with decrease and increase, respectively, of the envelope of the amplitude variations of the sound currents which are recorded in the remaining part of the same track area. In the positive print of this particular sound record, the highest percentage of allowable opaque track area for low volume sounds is obtained to thus insure minimum ground noise in reproduction. In this center noise reduction type sound track, the record in accordance with the sound currents can be a variable area push-pull record or a variable area bilateral record depending upon the type of sound record desired. The push-pull record is preferred because it gives advantages from the standpoint of distortion reduction and improved signal-to-noise ratio.

Since the introduction of high speed, fine grain film for sound recording, it has been possible in recording operations to record the original sound as a direct positive to thus eliminate a relatively expensive printing step in the series of operations necessary to obtain the final or release positive film. After development, a direct positive sound record can be used immediately in ensuing editing and rerecording operations. However, many problems have been encountered in efforts to develop a system for recording a direct positive variable area sound record having center noise reduction. A system employing a plurality of reflecting surfaces, such as polished light valve ribbons movable in accordance with the currents to be recorded, has the disadvantage that a non-conventional type optical system must be used and, further, the necessary polishing of the ribbons to obtain a reflecting surface, so lowers the tensile strength of the ribbons that it is difficult to maintain the high ribbon tuning necessary to produce the required response of the ribbons at higher frequencies. In addition, a perfect reflecting ribbon surface is extremely difficult to obtain and imperfection in a ribbon surface produces a streaky image on the film.

Applicant conceived that with certain novel modifications applied to the light valve and optical system of a standard light valve recording system, the desired direct positive sound record with center noise reduction could be produced. In accordance with this invention, a mask containing two laterally offset rectangular apertures is secured to the pole face of one of the two confronting pole-pieces of a light valve to thus produce, at the exit side of the light valve, two laterally separated rectangular light beams having their longer dimension extending laterally with respect to the film. The longer dimension of one of the apertures in the mask is greater than the longer dimension of the other aperture to thus define two light beams of unequal length laterally of the film. This apertured mask is so placed in the light valve that when this valve is disposed in the optical recording system, the centers of the apertures in the mask are displaced equal distance on opposite sides of the axis of the optical system. The lateral dimension of the longer of the two apertures is such that when the light beam defined thereby is projected to the recording film by the optical objective system employed, its lateral dimension will equal substantially the lateral dimension of the assigned sound track area on the film. The lateral dimension of the shorter of the two apertures is such that when the light beam defined thereby is projected to the film, its lateral dimension will equal approximately one-half the lateral dimension of the assigned sound track area on the film. The light beam defined by the longer one of the two apertures is variably masked from the center toward the outer edges by a current conducting light valve ribbon movable in response to sound currents. The light beam defined by the shorter one of the two apertures is variably masked equally and simultaneously from the outer edges inwardly toward the center by a pair of current conducting ribbons movable toward each other in response to the envelope of the amplitude variations of the sound currents. The objective lens system provided for imaging the masking ribbons at the plane of the recording film incorporates a biprism which is so located with respect to the lens elements and the recording film that each of the modulated light beams projected to the film by the lens elements is deflected inwardly toward the optical axis an amount sufficient to produce coincidence of the light beam centers at the lateral center line of the sound track area on the film.

The variable masking of the longer of the two light beams is from the center alternately to one edge and then to the other in accordance with the sound frequencies to produce a push-pull sound record on the film. The envelope of the amplitude variations of the sound currents is recorded on the otherwise unused center portion of the sound track and appears as an opaque area varying in width to both sides of the track center line.

The invention may be more clearly understood by reference to the specification when read in connection with the accompanying drawings in which.

Figure 1:
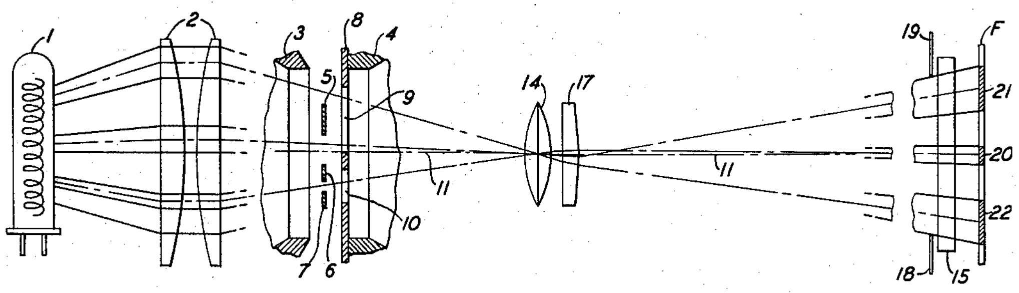
Fig. 1 is a schematic plan view of the light valve recording system in accordance with this invention.

Referring to Fig. 1, a beam of light from a light source 1 is projected by a condenser lens system 2 toward a light valve, the opposing apertured pole-pieces 3 and 4 of which are shown as forming an air gap between them. Three current conducting ribbons 5, 6 and 7 are disposed in the magnetic field in the air gap between the pole faces of the pole-pieces 3 and 4 of the light valve. An apertured mask 8 is secured to the pole face of pole-piece 4. This mask 8 is provided with two rectangular apertures 9 and 10 having their longer dimensions disposed laterally of a recording film F. The distance from the center of aperture 9 to the center line 11 of the optical recording system is equal to the distance from this optical center line to the center of aperture 10.

The center of ribbon 5 is aligned with the center of aperture 9 and this ribbon extends with its longer dimension in the direction of the longitudinal axis of film F. When sound currents from a source connected to terminals 12 (Fig. 3) are applied to ribbon 5, the ribbon, by reason of its immersion in a magnetic field, will move from side to side across the longer dimension of aperture 9 to thus variably mask the light beam defined by aperture 9 from the center alternately toward one end and then the other. The light beam so modulated will be recorded as a push-pull sound record in which, after development, the marginal edges of the sound record will be opaque and the center portion, which has been unaffected by light, will be clear. A direct positive, push-pull, variable area sound track is thus produced on a film by the described modulation of the light beam defined by aperture 9.

Figure 3:
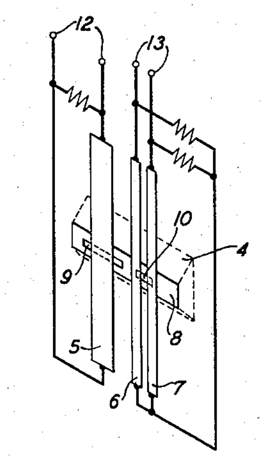
Fig. 3 is a perspective view showing the ribbon and mask arrangement of the light valve together with the electrical connections from the sources of sound and bias currents to the light valve ribbons.

The ribbons 6 and 7 are disposed in spaced relation in a manner to mask the end portions of the light beam defined by aperture 10. As shown in Fig. 3, ribbons 6 and 7 are connected to terminals 13 to which is connected a source of currents varying in accordance with the envelope of the amplitude variations of the sound currents. These currents will travel in opposite directions in the two ribbons which, being immersed in a magnetic field, move toward and away from each other in response to the envelope currents to variably mask the light beam defined by aperture 10 equally and simultaneously from the opposite edges toward the center thereof. This light beam will be recorded on the film as a bilateral, variable area record having a maximum dimension laterally of the film equal approximately to one-half the lateral dimension of the prescribed sound track area on the film F.

Conducting ribbons 5, 6 and 7, as shown in Figs. 1 and 3, are in the position they assume with their operating circuits disengaged therefrom. When these operating circuits are connected to the ribbons, and prior to the application of sound currents thereto, the circuit to terminals 13 contains means for applying a direct current to ribbons 6 and 7 to produce an opening of these ribbons sufficient to permit the passage of the maximum light beam defined by aperture 10. When a recording operation begins and the sound currents are applied to ribbon 9 to produce movement thereof, the rectified sound currents obtained in the circuit to terminals 13 (which currents vary in accordance with the envelope of the amplitude variations of the sound currents) will oppose the direct current or static bias already applied to ribbons 6 and 7. The larger the volume of the sound to be recorded, the smaller will be the opening between ribbons 6 and 7 and the smaller the light beam from aperture 10. The static bias is fully opposed at the maximum volume of sound to be recorded so that ribbons 6 and 7 never approach each other closer than their initially adjusted position as shown in Figs. 1 and 3.

The light valve ribbons are imaged at the plane of film F by an objective lens system including a spherical lens 14 and a cylindrical lens 15.

An optical element, in the form of a biprism 17, is so located with respect to the lens elements and the recording film that each of the modulated light beams projected to the film by the lens elements is shifted in a horizontal plane, as shown in Fig. 1, toward the axis of the optical system to produce at the film an arrangement of light beams such that the two beams defined by aperture 9 and the edges of ribbon 5 occupy the opposite marginal areas of the prescribed sound track area on the film F and the light beam defined by the facing edges of ribbons 6 and 7 with the aperture 10, extends equally to opposite sides of the center of the prescribed sound track area on film F. Masks 18 and 19 define the opposite vertical edges of the recording light beam.

Figure 2:
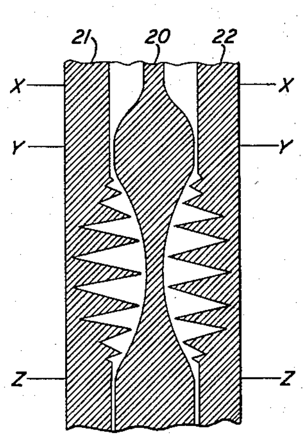
Fig. 2 is a front elevation of the sound track area of the recording film of Fig. 1.

Fig. 2 shows the direct positive, push-pull variable area sound track produced on the film F by the system of Fig. 1. That portion of the film across the track at line *x—x* shows the position of the light beam at the track area on the film when the light valve is disconnected from the operating circuit therefor. The line across the sound track at *y—y* shows the lateral dimensions and relative positions of the light beams recorded on the film when static bias is applied to ribbons 6 and 7 but no sound is applied to the ribbon 5. The length of sound track between lines *y—y* and *z—z* in this figure shows the light beam modulations when a single frequency, varying amplitude sound current is applied to the light valve ribbons 5, 6 and 7. As indicated in Fig. 2, the light from aperture 10, which produces the center noise reduction record 20, decreases in width with increase in volume of the sound being recorded in push-pull in records 21 and 22.

The biprism 17 is mounted in the lens tube of a recording unit, preferably between two spherical lens elements of the objective lens system. This biprism is, in effect, two prisms joined base to base but, because of the fact that one of the base angles of each prism is a right angle, this optical unit may be made from a single piece of glass with one side flat. The sloping sides of the biprism, if extended, would meet the base side in a small angle of the order of one or two degrees. Each light beam emerging from the film side of biprism 17 is displaced in a horizontal plane from its original direction toward the center line 11 of the optical system to produce the desired arrangement of light beams within the prescribed sound track area laterally of the film F.

By means of the recording arrangement provided in accordance with this invention, a direct positive, push-pull sound record with center noise reduction is obtainable with novel structural and optical modification of an existing light valve recording system employed in present standard film recording units.

What is claimed is:

1. The combination in a system for recording on a photographic film a direct positive, variable area sound record having a centrally disposed noise reduction record, of a source of light, means forming two rectangular light beams offset in the direction of their longer dimension laterally with respect to said film, one of said light beams being longer than the other of said light beams laterally of said film, means for variably masking the light of the longer one of said light beams from the center outwardly toward the edges thereof in accordance with sound currents to be recorded, means for variably masking the light of the other of said light beams equally from the opposite ends toward the center thereof with magnitude of currents varying in accordance with the envelope of the amplitude variations of the sound currents being recorded, means for projecting said light beams to said film, and means altering the path of travel of said light beams to produce coincidence of the centers of said light beams at the lateral center of the sound track area on said film.

2. The combination in a system for recording a noiseless, direct positive, push-pull variable area sound record on a photographic film, of a light source, means for directing a rectangular beam of light from said source toward said film, said rectangular beam of light having its longer dimension disposed transversely of said film, means for dividing said light beam into two light beams of dissimilar length transversely of said film, said light beams being disposed on opposite sides of the optical axis of said recording system, means for masking substantially one-half of the length of the longer of said two light beams from the center toward opposite edges thereof, means producing movement of said masking means across the length of said longer light beam alternately in one direction and then the other in accordance with sound currents to be recorded, means for masking the shorter of said two light beams from the opposite ends equally and simultaneously toward the center thereof in accordance with the magnitude of currents varying in accordance with the envelope of the amplitude variations of said sound currents being recorded, optical means for projecting said light beams toward said film, and light diverting means disposed in the path of each of said light beams for altering the path of travel of said two light beams in opposite directions laterally of said film to produce coincidence of the centers of said two light beams at the lateral center of a prescribed sound track area on said film.

3. In a system for recording a noiseless, direct positive, push-pull variable area sound record in the sound track area of a photographic film moved at constant speed, the combination of a light valve having an opaque pole member provided with two rectangular apertures offset laterally with respect to and having their longer dimensions extending laterally of said film, an opaque conducting ribbon centrally disposed in front of one of said apertures and movable laterally across the longer dimension of said aperture in response to sound currents applied thereto, a pair of spaced opaque conducting ribbons disposed at opposite ends of the second one of said apertures, said pair of ribbons being moved laterally toward each other in response to the magnitude of currents varying in accordance with the envelope of the amplitude variations of said sound currents, a light source, a lens system focusing light from said source to illuminate the two apertures in said pole member, and an objective lens system including elements for imaging said apertures in said pole member at the film plane and for producing coincidence of the centers of said two images at the center of the sound track area on said film.

4. In a system for recording a direct positive, push-pull sound record in the sound track area of a photographic film moved at constant speed, the combination of a light source, a light valve disposed in the light from said source and having opposed apertured pole-pieces forming an air gap between them, means producing a magnetic field in the air gap of said light valve, apertured masking means associated with said light valve producing a pair of rectangular light beams of dissimilar length laterally of said film, an objective lens system including optical means projecting said laterally offset light beams to said film and diverting the path of said light beams to produce coincidence of the centers thereof at the center of the sound track area of said film, a first opaque ribbon movable laterally of said film in response to said sound currents, said first ribbon being located in the air gap between said light valve pole-pieces and centrally disposed with respect to the longer one of said pair of light beams, and second and third opaque ribbons movable toward each other laterally of said film with an increase in currents varying in accordance with the envelope of the amplitude variations of the sound currents, said second and third ribbons being located in the air gap between the pole-pieces of said light valve and disposed with their facing edges at opposite ends of the shorter one of said pair of light beams.

5. The combination in a system for recording a noiseless, direct positive, variable area sound track on a photographic film moved at constant speed, of a light source, means for projecting light from said source to said film, a light valve disposed in the path of light from said source, said light valve incorporating a pair of opposed pole members forming an air gap between them, said pole-pieces having aligned apertures defining a rectangular beam of light having its longer dimension transverse to the axis of said film, magnetic means for forming a constant magnetic field in the air gap between said opposed pole-pieces, a mask secured to one of said pole-pieces, said mask having two rectangular light beam defining apertures of dissimilar length disposed in the light beam defined by the aligned apertures in said pole-pieces, a first opaque current conducting ribbon located in the air gap between said pole-pieces and centrally disposed in front of the longer one of the two apertures in said mask, second and third opaque current conducting ribbons located in the air gap between said pole-pieces and disposed at opposite edges of the shorter one of the two apertures in said mask, a source of sound currents, a source of currents varying in accordance with the envelope of the amplitude variations of said sound currents, means connecting said source of said sound currents to said first opaque ribbon to produce movement thereof across the longer one of the two apertures in said mask, means connecting said second-mentioned source of current to said second and said third opaque ribbons to produce movement thereof toward each other across the shorter of the two apertures in said mask in accordance with the magnitude of the currents from said second-mentioned source, means for imaging the apertures in said mask at the plane of said film, and means producing coincidence of the centers of said images at the center of the sound track area on said film.

References Cited in the file of this patent

UNITED STATES PATENTS

| | | |
|---|---|---|
| 2,125,890 | Cook | Aug. 9, 1938 |
| 2,275,537 | Manderfeld | Mar. 10, 1942 |
| 2,514,633 | Frayne | July 11, 1950 |